(12) United States Patent
Yu (10) Patent No.: US 12,391,325 B2
(45) Date of Patent: Aug. 19, 2025

(54) ANTI-THEFT LOCK CATCH FOR MOTORCYCLE RIDING EQUIPMENT

(71) Applicant: Hangzhou Xibu Technology Co., Ltd., Zhejiang Province (CN)

(72) Inventor: Changwei Yu, Zhejiang Province (CN)

(*) Notice: Subject to any disclaimer, the term of this patent is extended or adjusted under 35 U.S.C. 154(b) by 178 days.

(21) Appl. No.: 18/371,997

(22) Filed: Sep. 22, 2023

(65) Prior Publication Data

US 2025/0019024 A1 Jan. 16, 2025

(30) Foreign Application Priority Data

Jul. 13, 2023 (CN) .......................... 202321832551.5

(51) Int. Cl.
*B62J 9/30* (2020.01)

(52) U.S. Cl.
CPC ...................... *B62J 9/30* (2020.02)

(58) Field of Classification Search
CPC ......... B62J 9/27; B62J 9/23; B62J 9/24; B62J 9/20; B62J 9/30; B62J 9/21; B62J 7/08; B62J 7/02
See application file for complete search history.

(56) References Cited

U.S. PATENT DOCUMENTS

| | | | | |
|---|---|---|---|---|
| 8,292,139 | B2* | 10/2012 | Golub | B62J 7/08 224/558 |
| 9,428,234 | B2* | 8/2016 | Bopanna | B62J 9/23 |
| 11,167,813 | B2* | 11/2021 | Chuang | B62J 7/02 |
| 12,054,217 | B2* | 8/2024 | Visenzi | B62K 19/40 |
| 12,227,256 | B2* | 2/2025 | Xicola Serrano | B62J 9/23 |
| 2020/0231239 | A1* | 7/2020 | Visenzi | B62J 7/02 |
| 2025/0100641 | A1* | 3/2025 | Lepage | B62J 7/08 |

* cited by examiner

*Primary Examiner* — Corey N Skurdal
(74) *Attorney, Agent, or Firm* — Ying-Ting Chen; Law Office of Michael Chen (57) ABSTRACT

An anti-theft lock catch for motorcycle riding equipment may include a male buckle and a female buckle. The front surface of the female buckle is detachably connected with a reinforced sheet metal through a sheet metal fixing screw; a handle shell is integrally formed above the female buckle; a handlebar top cover is fixedly connected above the handle shell; the left and right sides of the front part of the handlebar top cover are detachably connected with handlebar side covers through screws; an anti-theft lock hole is arranged inside the handlebar side cover on the left side; the anti-theft lock hole is also arranged on the left side of the rear surface of the handle shell; a handlebar button is slidably connected in the handle shell; and the upper surface of the handlebar button is fixedly connected with a plurality of springs.

7 Claims, 7 Drawing Sheets

ANTI-THEFT LOCK CATCH FOR MOTORCYCLE RIDING EQUIPMENT

FIELD OF THE INVENTION

The utility model relates to the field of motorcycle side bag appliances, in particular to an anti-theft lock catch for motorcycle riding equipment.

BACKGROUND OF THE INVENTION

A motorcycle is a two-wheeled or three-wheeled vehicle driven by a gasoline engine and having a handlebar used to control front wheel steering. The motorcycle is light, flexible, and fast in driving, and is widely used in patrol and passenger and cargo transportation and also used as a sports apparatus.

Generally on the two-wheeled motorcycle, a user will install a side bag. Because the side bag is mainly made of cloth and has strong extended capability, irregular things can also be installed into the side bag by adjusting the space, to achieve the function of storing articles.

At present, in order to solve the problem that the riding side bag is fixed on the riding equipment more quickly and conveniently to realize fast fixation and taking of the side bag by a customer and prevent theft, the present invention provides an anti-theft lock catch for motorcycle riding equipment, which can achieve that various daily specific side bags can be quickly assembled on the riding equipment through a buckle.

SUMMARY OF THE INVENTION

The utility model mainly solves the technical problem of providing an anti-theft lock catch for motorcycle riding equipment, which can solve the problems proposed in the above background.

In order to solve the above technical problems, according to one aspect of the utility model, more specifically, an anti-theft lock catch for motorcycle riding equipment comprises a male buckle and a female buckle; the front surface of the female buckle is detachably connected with a reinforced sheet metal through a sheet metal fixing screw; a handle shell is integrally formed above the female buckle; a handlebar top cover is fixedly connected above the handle shell; the left and right sides of the front part of the handlebar top cover are detachably connected with handlebar side covers through screws; an anti-theft lock hole is arranged inside the handlebar side cover on the left side; the anti-theft lock hole is also arranged on the left side of the rear surface of the handle shell; a handlebar button is slidably connected in the handle shell; the upper surface of the handlebar button is fixedly connected with a plurality of springs, and the upper surfaces of the springs are in contact with the lower surface of the handlebar top cover; the inner left side of the handle shell is rotatably connected with a lock catch rotating sheet through a rotating shaft; one side of the upper part of the lock catch rotating sheet is in contact with one side of the upper surface of the handlebar button; the inner left upper part of the female buckle is fixedly connected with a connecting rod assembly fixing buckle; a lock catch connecting rod assembly is slidably connected in the connecting rod assembly fixing buckle, and the upper surface of the lock catch connecting rod assembly is in contact with the lower end of the lock catch rotating sheet; the lower part of the lock catch connecting rod assembly is in contact with a lock catch pressing sheet; a lock catch spring is sleeved outside the lock catch pressing sheet; the lower part of the lock catch pressing sheet is in contact with a lock catch assembly; the right end of the lock catch assembly is fixedly connected with a lock catch bolt; the left end of the lock catch assembly is fixedly connected with a bolt spring; the front part of the lower surface of the lock catch spring is fixedly connected with a lock catch body; the male buckle is detachably connected in the female buckle; the front surface of the male buckle is provided with a male buckle fixing gasket; a male buckle fixing screw is arranged in the male buckle fixing gasket; the male buckle fixing screw penetrates to the rear of the male buckle; and the rear part of the outer side wall of the male buckle fixing screw is detachably connected with a fixing block.

Further, the rear of the lock catch body is provided with the lock catch assembly, and the lock catch assembly is slidably connected with the lock catch body.

Further, the front surface of the handlebar side cover is inserted with a nut cap, and the nut cap is detachably connected with the handlebar side cover.

Further, the anti-theft lock hole on the handlebar side cover is communicated with the anti-theft lock hole on the handle shell.

Further, the left side of the bolt spring is fixed with the inside of the female buckle.

Further, the left side and the right side of the front surface of the male buckle are provided with wrench storage grooves, and a wrench is clamped inside one of the wrench storage grooves.

Further, the lock catch bolt is inserted into the male buckle, and the lock catch bolt is slidably connected with the male buckle.

The anti-theft lock catch for motorcycle riding equipment in the utility model has the beneficial effects:

The invention of the anti-theft lock catch can be conveniently and quickly assembled and taken in actual use, and has the effect of anti-theft to prevent the side bag from being easily stolen. At the same time, the buckle can be configured with various side bags, which is convenient and quick to fix the side bags on the riding equipment.

BRIEF DESCRIPTION OF THE DRAWINGS

The utility model is further described below in detail in combination with the drawings and specific implementation methods.

DETAILED DESCRIPTION OF THE INVENTION

The utility model will be described in detail below by reference to the drawings and in conjunction with embodiments. It should be explained that if there is no conflict, the embodiments in the present application and the features in the embodiments can be mutually combined.

As shown in FIGS. 1-7 of the utility model, an anti-theft lock catch for motorcycle riding equipment is provided, comprising a male buckle 10 and a female buckle 11; the front surface of the female buckle 11 is detachably connected with a reinforced sheet metal 1 through a sheet metal fixing screw 7; a handle shell 24 is integrally formed above the female buckle 11; a handlebar top cover 6 is fixedly connected above the handle shell 24; the left and right sides of the front part of the handlebar top cover 6 are detachably connected with handlebar side covers 5 through screws; an anti-theft lock hole 2 is arranged inside the handlebar side cover 5 on the left side; the anti-theft lock hole 2 is also arranged on the left side of the rear surface of the handle shell 24; a handlebar button 3 is slidably connected in the handle shell 24; the upper surface of the handlebar button 3 is fixedly connected with a plurality of springs 17, and the upper surfaces of the springs 17 are in contact with the lower surface of the handlebar top cover 6; the inner left side of the handle shell 24 is rotatably connected with a lock catch rotating sheet 18 through a rotating shaft; one side of the upper part of the lock catch rotating sheet 18 is in contact with one side of the upper surface of the handlebar button 3; the inner left upper part of the female buckle 11 is fixedly connected with a connecting rod assembly fixing buckle 15; a lock catch connecting rod assembly 16 is slidably connected in the connecting rod assembly fixing buckle 15, and the upper surface of the lock catch connecting rod assembly 16 is in contact with the lower end of the lock catch rotating sheet 18; the lower part of the lock catch connecting rod assembly 16 is in contact with a lock catch pressing sheet 21; a lock catch spring 19 is sleeved outside the lock catch pressing sheet 21; the lower part of the lock catch pressing sheet 21 is in contact with a lock catch assembly 14; the right end of the lock catch assembly 14 is fixedly connected with a lock catch bolt 23; the left end of the lock catch assembly 14 is fixedly connected with a bolt spring 22; the front part of the lower surface of the lock catch spring 19 is fixedly connected with a lock catch body 20; the male buckle 10 is detachably connected in the female buckle 11; the front surface of the male buckle 10 is provided with a male buckle fixing gasket 13; a male buckle fixing screw 12 is arranged in the male buckle fixing gasket 13; the male buckle fixing screw 12 penetrates to the rear of the male buckle 10; and the rear part of the outer side wall of the male buckle fixing screw 12 is detachably connected with a fixing block 25.

Figure 1:
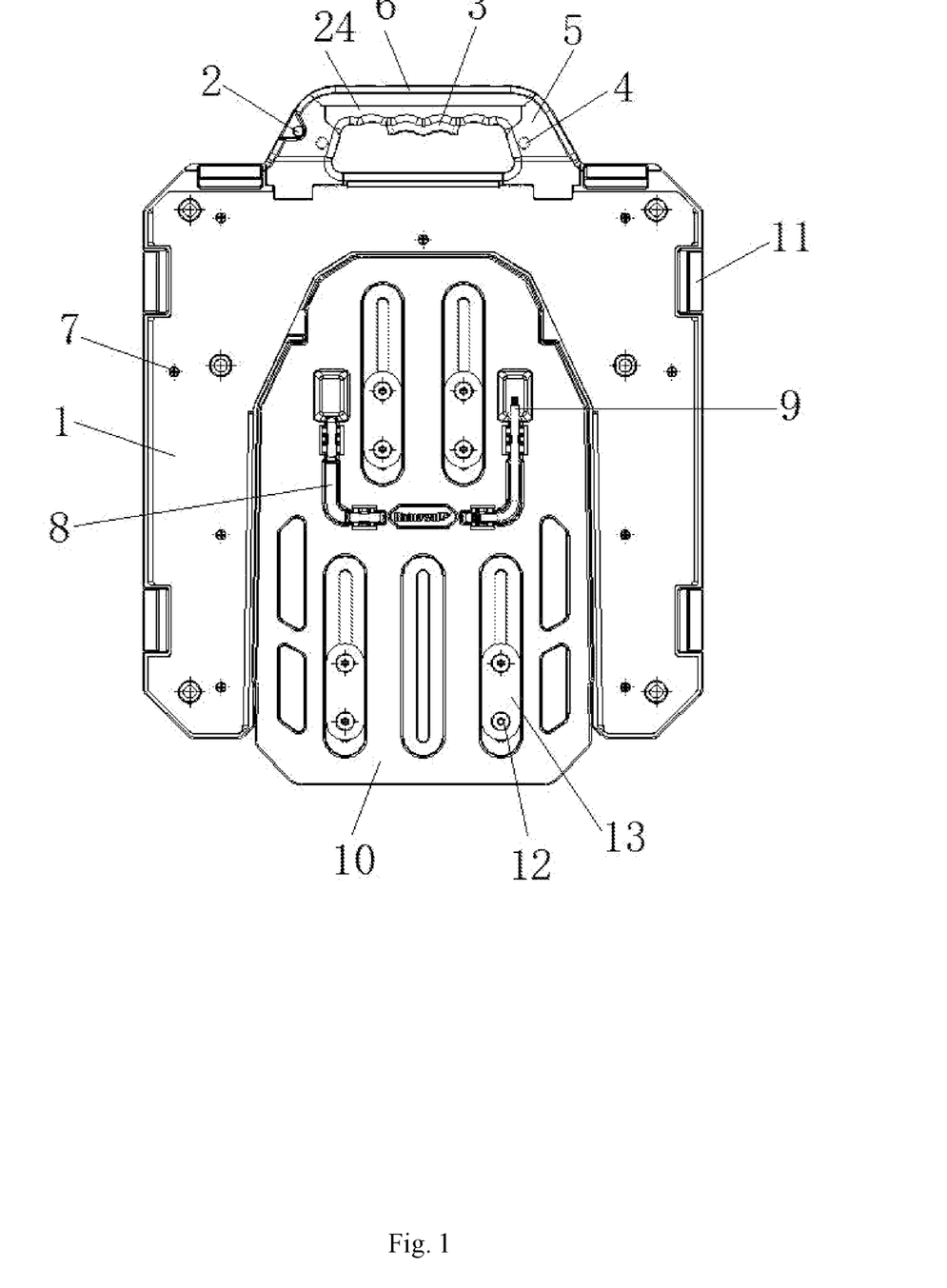
FIG. 1 is an integral structural schematic diagram of an anti-theft lock catch for motorcycle riding equipment in the utility model.
Figure 2:
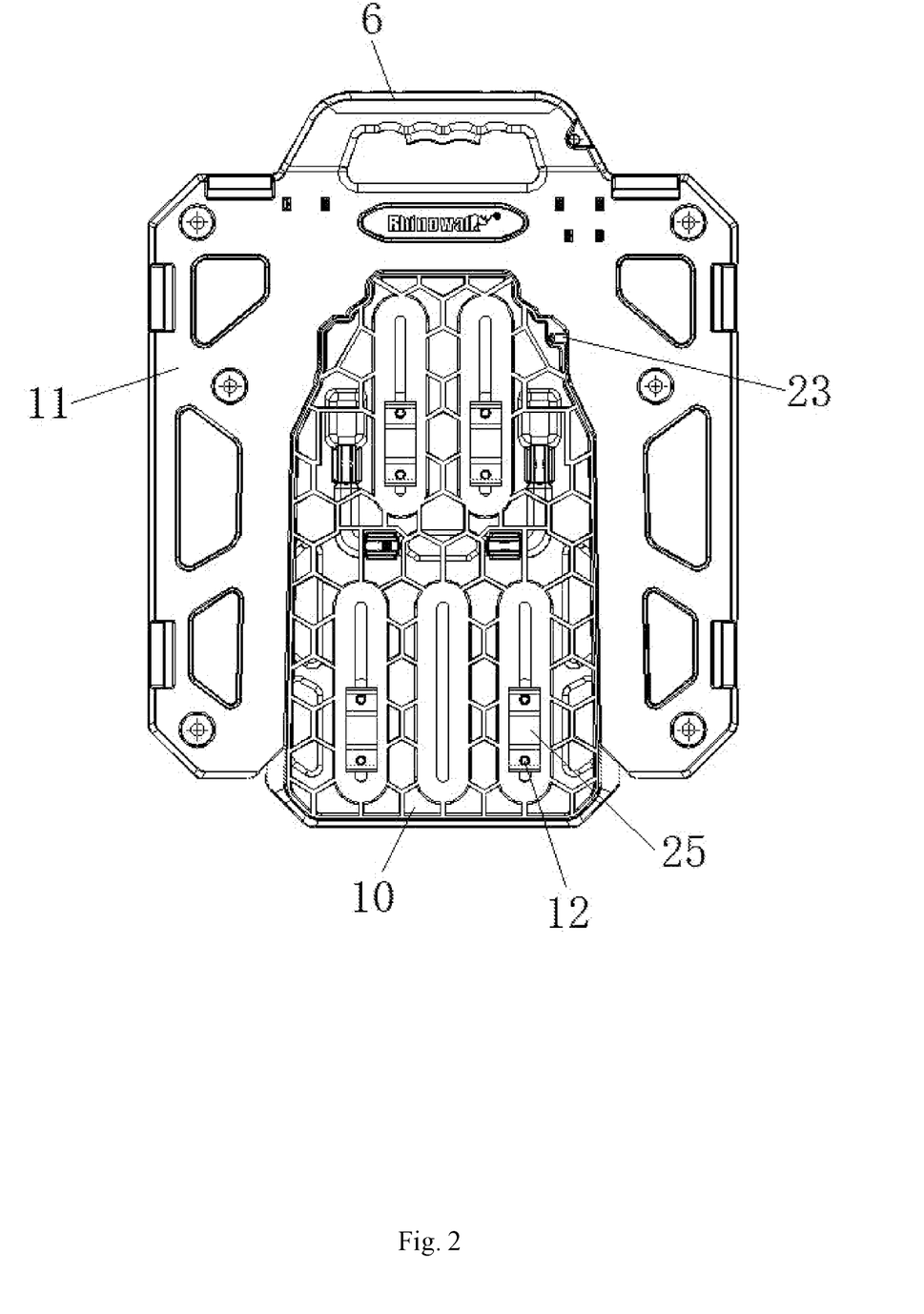
FIG. 2 is a rear structural schematic diagram of an anti-theft lock catch for motorcycle riding equipment in the utility model.
Figure 3:
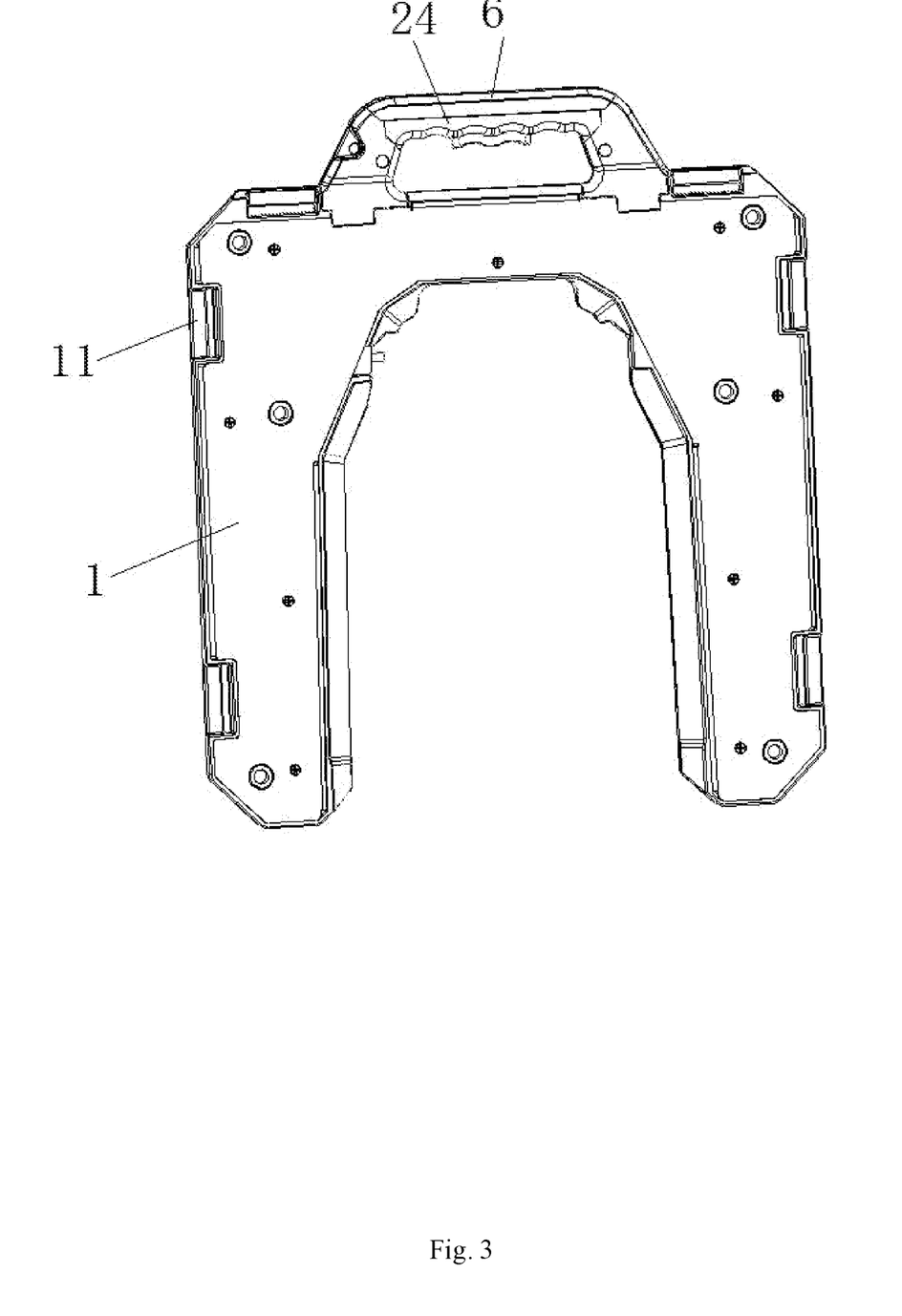
FIG. 3 is an external structural schematic diagram of a reinforced sheet metal and a female buckle in the utility model.
Figure 4:
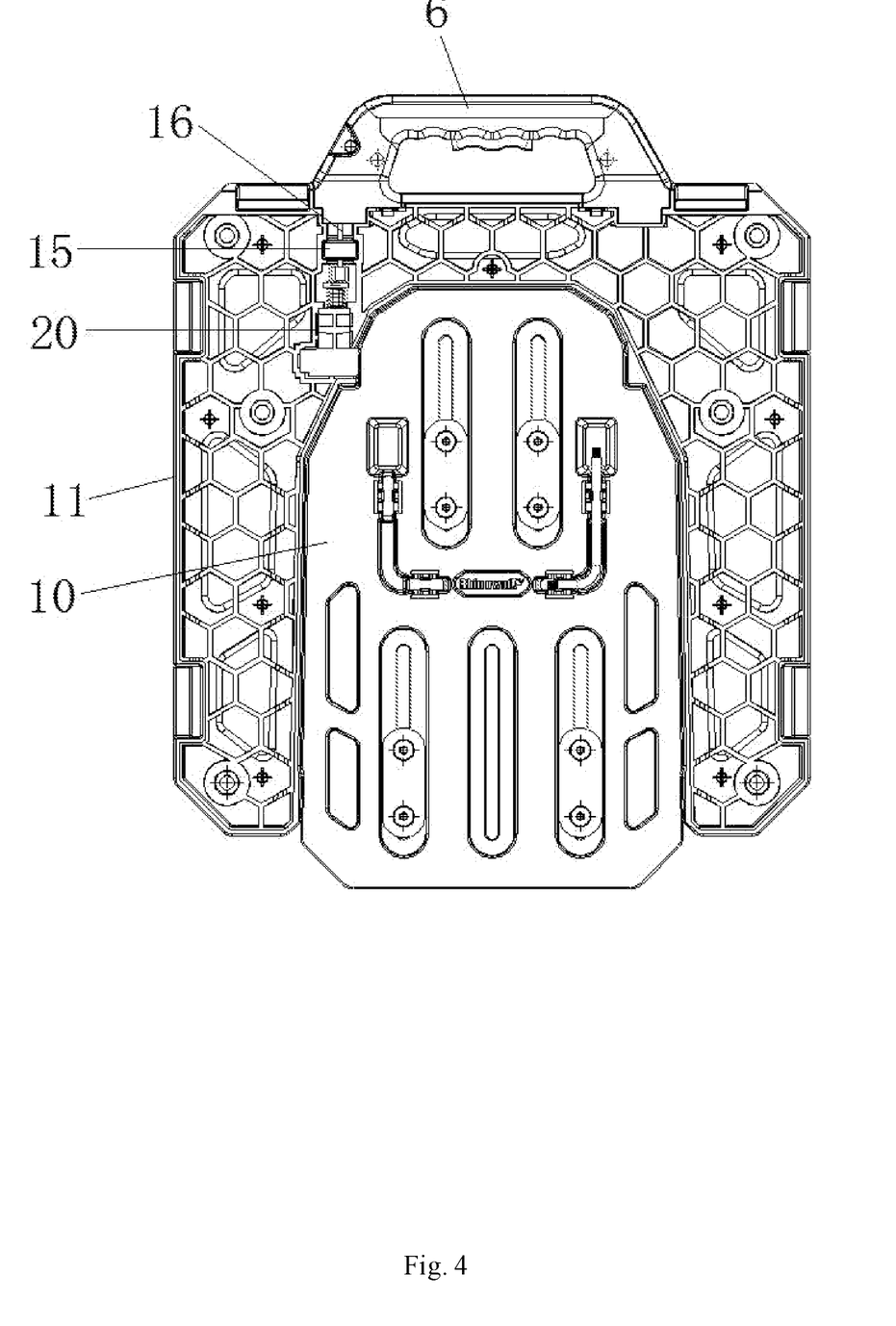
FIG. 4 is a structural schematic diagram after the reinforced sheet metal is removed in FIG. 1 in the utility model.
Figure 5:
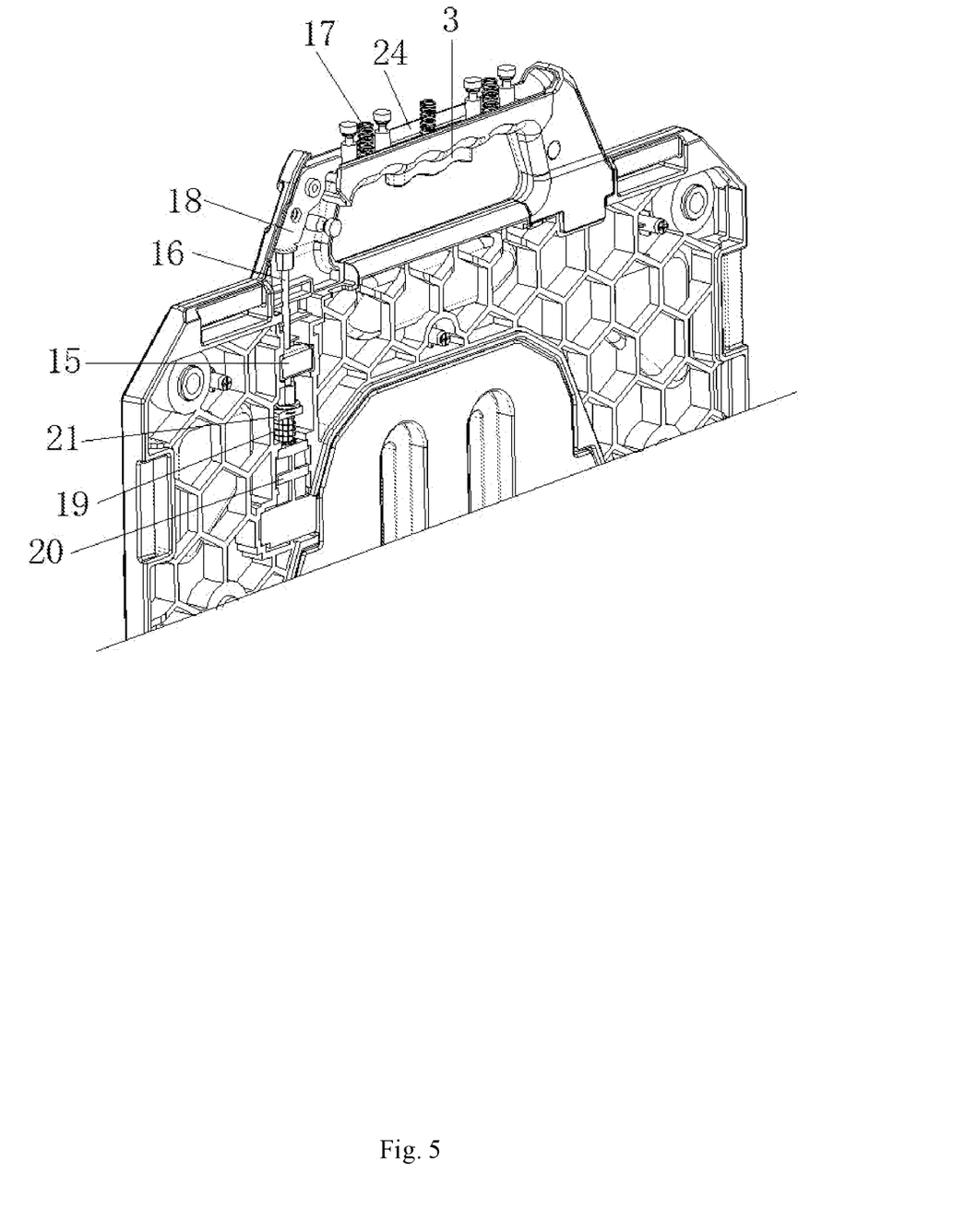
FIG. 5 is a structural schematic diagram after a handlebar side cover and a handlebar top cover are removed in FIG. 4 in the utility model.
Figure 6:
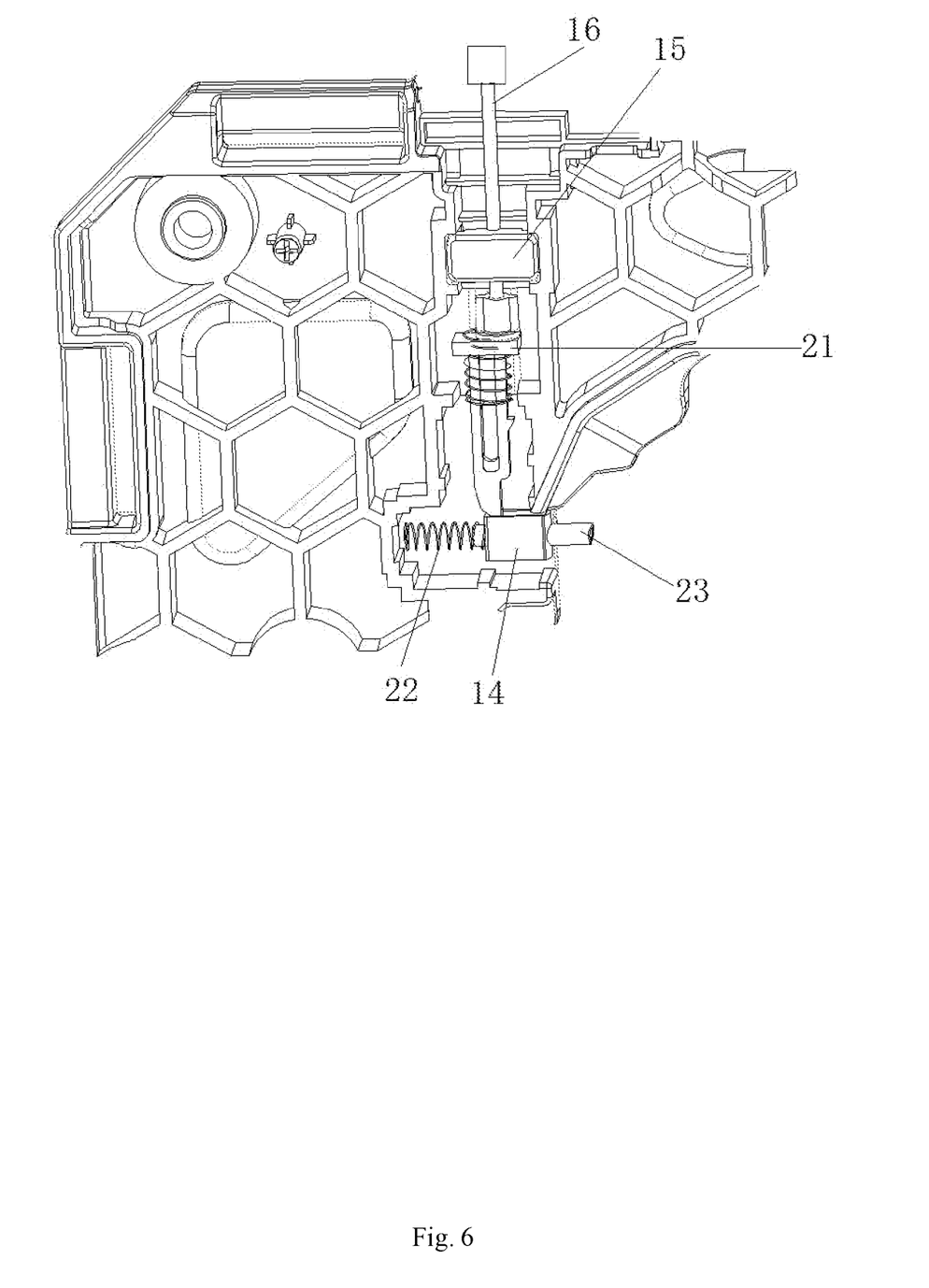
FIG. 6 is a local amplified structural schematic diagram in FIG. 5 in the utility model.
Figure 7:
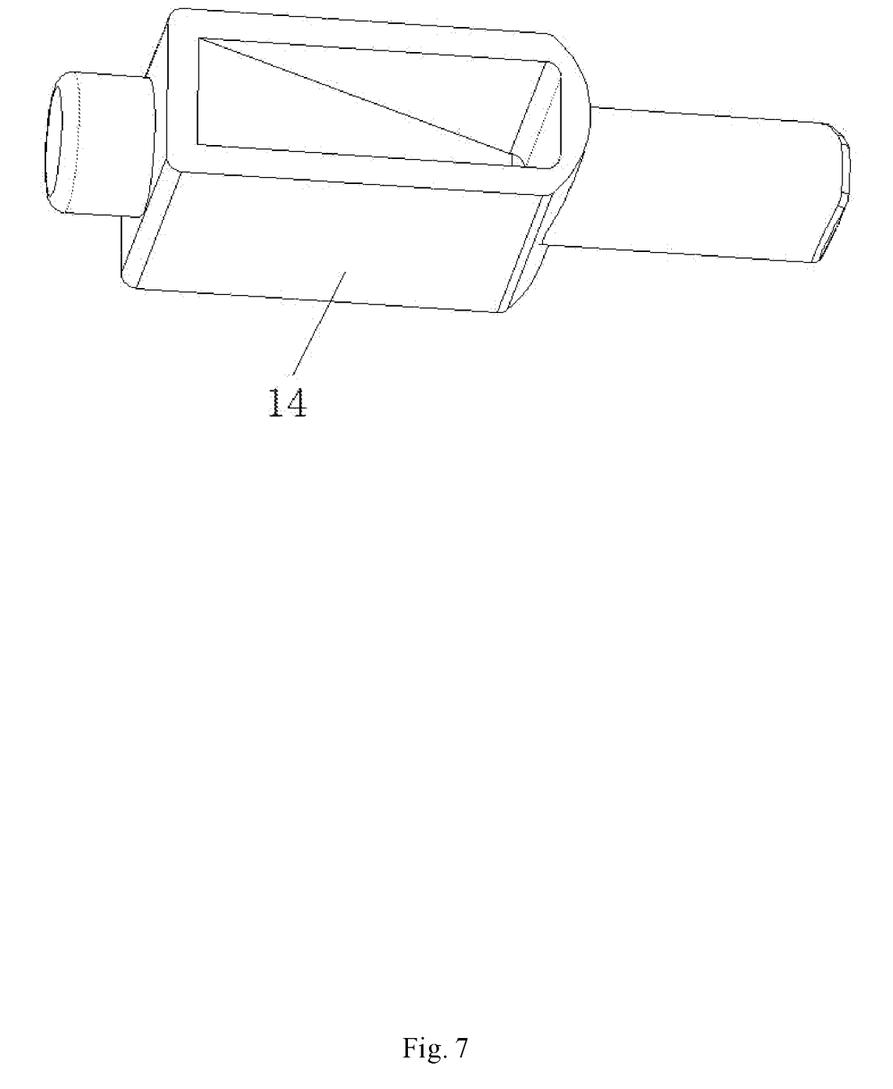
FIG. 7 is a structural schematic diagram of a lock catch assembly in the utility model.

In the present embodiment, the solution adopts the design of two parts: a male buckle 10 and a female buckle 11. The male buckle 10 is an integrated design and has a fixing groove fixed to the riding equipment through a male buckle fixing gasket 13, a male buckle fixing screw 12 and a fixing block 25. The female buckle 11 have the fittings of a reinforced sheet metal 1, a handlebar button 3, a lock catch connecting rod assembly 16, a connecting rod assembly fixing buckle 15, a lock catch rotating sheet 18, a handlebar top cover 6, handle side covers 5, a lock catch assembly 14 (a lock catch body 20, a lock catch bolt 23 and a lock catch pressing sheet 21), a spring 17, a lock catch spring 19 and a bolt spring 22. After the above fittings of the female buckle 11 are assembled, the female buckle 11 is fixed on the side bag with screws, the male buckle 10 is inserted into the female buckle 11, and the anti-theft fixing function of the side bag is realized through the matching of the lock catch assembly 14 and the male buckle 10 by the lock. The handlebar button 3 on the inner side of the handlebar adopts a hidden design and is integrated with the female buckle 11. The structure of the lock catch assembly 14 is shown in FIG. 7.

In the present embodiment, the rear of the lock catch body 20 is provided with the lock catch assembly 14, and the lock catch assembly 14 is slidably connected with the lock catch body 20.

In the present embodiment, the front surface of the handlebar side cover 5 is inserted with a nut cap 4, the nut cap 4 is detachably connected with the handlebar side cover 5 and the handlebar side cover 5 can be disassembled.

In the present embodiment, the anti-theft lock hole 2 on the handlebar side cover 5 is communicated with the anti-theft lock hole 2 on the handle shell 24, and the anti-theft lock hole 2 can be assembled with a lock.

In the present embodiment, the left side of the bolt spring 22 is fixed with the inside of the female buckle 11. When the bolt spring 22 is extruded, the bolt spring is compressed to the left side.

In the present embodiment, the left side and the right side of the front surface of the male buckle 10 are provided with wrench storage grooves 8, and a wrench 9 is clamped inside one of the wrench storage grooves 8. The wrench 9 can be used by users when a motorcycle is repaired.

In the present embodiment, the lock catch bolt 23 is inserted into the male buckle 10, and the lock catch bolt 23 is slidably connected with the male buckle 10. When the lock catch bolt 23 is inserted into the male buckle 10, the female buckle 11 and the male buckle 10 form a whole.

The working principle of the device is as follows: firstly, when the device is used, the male buckle 10 is fixed on the riding equipment at first during use; the female buckle 11 is fixed on the side bag; the side bag and the female buckle 11 are inserted into the male buckle 10, and automatically lock the male buckle and the female buckle when they are in place; and for anti-theft, a lock can be assembled at the lock hole of the female buckle to play an anti-theft role. When the side bag is taken down, the button 3 at the handlebar needs to be pressed. When the button at the handlebar is moved to a limit position, the female buckle 11 and the side bag can be lifted. Electric elements that appear herein are all existing electric elements in reality.

Of course, the above explanation is not a limitation to the utility model, and the utility model is not limited to the above examples. Changes, modifications, additions or replacements made by those ordinary skilled in the art within the substantial scope of the utility model also belong to the protection scope of the utility model.

What is claimed is:

1. An anti-theft lock catch for motorcycle riding equipment, comprising a male buckle (10) and a female buckle (11), wherein a front surface of the female buckle (11) is detachably connected with a reinforced sheet metal (1) through a sheet metal fixing screw (7); a handle shell (24) is integrally formed above the female buckle (11); a handlebar top cover (6) is fixedly connected above the handle shell (24); a left and right sides of a front part of the handlebar top cover (6) are detachably connected with handlebar side covers (5) through screws; an anti-theft lock hole (2) is arranged inside the handlebar side cover (5) on the left side; the anti-theft lock hole (2) is also arranged on the left side of a rear surface of the handle shell (24); a handlebar button (3) is slidably connected in the handle shell (24); an upper surface of the handlebar button (3) is fixedly connected with a plurality of springs (17), and upper surfaces of the springs (17) are in contact with a lower surface of the handlebar top cover (6); an inner left side of the handle shell (24) is rotatably connected with a lock catch rotating sheet (18) through a rotating shaft; one side of an upper part of the lock catch rotating sheet (18) is in contact with one side of the upper surface of the handlebar button (3); an inner left upper part of the female buckle (11) is fixedly connected with a connecting rod assembly fixing buckle (15); a lock catch connecting rod assembly (16) is slidably connected in the connecting rod assembly fixing buckle (15), and an upper surface of the lock catch connecting rod assembly (16) is in contact with a lower end of the lock catch rotating sheet (18); a lower part of the lock catch connecting rod assembly (16) is in contact with a lock catch pressing sheet (21); a lock catch spring (19) is sleeved outside the lock catch pressing sheet (21); a lower part of the lock catch pressing sheet (21) is in contact with a lock catch assembly (14); a right end of the lock catch assembly (14) is fixedly connected with a lock catch bolt (23); a left end of the lock catch assembly (14) is fixedly connected with a bolt spring (22); a front part of the lower surface of the lock catch spring (19) is fixedly connected with a lock catch body (20); the male buckle (10) is detachably connected in the female buckle (11); a front surface of the male buckle (10) is provided with a male buckle fixing gasket (13); a male buckle fixing screw (12) is arranged in the male buckle fixing gasket (13); the male buckle fixing screw (12) penetrates to a rear of the male buckle (10); and a rear part of an outer side wall of the male buckle fixing screw (12) is detachably connected with a fixing block (25).

2. The anti-theft lock catch for motorcycle riding equipment according to claim 1, wherein a rear of the lock catch body (20) is provided with the lock catch assembly (14), and the lock catch assembly (14) is slidably connected with the lock catch body (20).

3. The anti-theft lock catch for motorcycle riding equipment according to claim 1, wherein a front surface of the handlebar side cover (5) is inserted with a nut cap (4), and the nut cap (4) is detachably connected with the handlebar side cover (5).

4. The anti-theft lock catch for motorcycle riding equipment according to claim 1, wherein the anti-theft lock hole (2) on the handlebar side cover (5) is communicated with the anti-theft lock hole (2) on the handle shell (24).

5. The anti-theft lock catch for motorcycle riding equipment according to claim 1, wherein a left side of the bolt spring (22) is fixed with an inside of the female buckle (11).

6. The anti-theft lock catch for motorcycle riding equipment according to claim 1, wherein a left side and a right side of the front surface of the male buckle (10) are provided with wrench storage grooves (8), and a wrench (9) is clamped inside one of the wrench storage grooves (8).

7. The anti-theft lock catch for motorcycle riding equipment according to claim 1, wherein the lock catch bolt (23) is inserted into the male buckle (10), and the lock catch bolt (23) is slidably connected with the male buckle (10).

\* \* \* \* \*